United States Patent [19]

Akiyama

[11] Patent Number: 4,697,924

[45] Date of Patent: Oct. 6, 1987

[54] MONOCHROMATOR

[75] Inventor: Osamu Akiyama, Kyoto, Japan

[73] Assignee: Shimadzu Corporation, Kyoto, Japan

[21] Appl. No.: 718,124

[22] Filed: Mar. 29, 1985

[30] Foreign Application Priority Data

Mar. 30, 1984 [JP] Japan ................................ 59-64771

[51] Int. Cl.⁴ ............................................. G01J 3/18
[52] U.S. Cl. ..................................... 356/333; 356/334
[58] Field of Search ................ 356/318, 332, 333, 334

[56] References Cited

U.S. PATENT DOCUMENTS

| | | | |
|---|---|---|---|
| 3,775,620 | 11/1973 | Meier | 356/334 X |
| 4,305,660 | 12/1981 | Kallet | 356/318 X |
| 4,371,263 | 2/1983 | Witte | 356/333 |
| 4,453,826 | 6/1984 | Witte | 356/333 |
| 4,464,051 | 8/1984 | Talmadge et al. | 356/323 |

OTHER PUBLICATIONS

Model 204, Manual #990-9685, section 5B.1, Apr. 1969.
Kriman, *Optics & Spectroscopy*, vol. 31, No. 6, Dec. 1971, p. 562.

Primary Examiner—F. L. Evans
Attorney, Agent, or Firm—Sughrue, Mion, Zinn, Macpeak, and Seas

[57] ABSTRACT

A monochromator, capable of functioning as either a single monochromator or a double monochromator by positioning of either reflective means or dispersion means in the optical path. Both the reflective means and the dispersion means are placed on a rotary bed which may be rotated by rotary drive means so that one of the above-mentioned optical means may be placed in the optical path, whereby the monochromator functions optimally, depending on the object to be measured.

8 Claims, 4 Drawing Figures

MONOCHROMATOR

BACKGROUND OF THE INVENTION

This invention relates to a monochromator used in a spectrophotometer or the like.

A monochromator is available in the form of a single monochromator adapted to dispose one dispersion element in an optical path, and a double monochromator adapted to arrange two dispersion elements in series with each other in the optical path. the single monochromator is simple in its structure but involves much stray light whereas the double monochromator is subject to much less stray light but has a lower sensitivity, viz., lower luminous intensity. In view of the fact that these monochromators have both merits and demerits, proper use of one type of monochromator or the other depends on the object to be measured.

Both single and double monochromators which are designed so that the diffraction gratings as dispersion elements are selected and switched over interchangeably in usage have been well known.

In both cases, however, one diffraction grating is used in a single monochromator for switchover while one or both of the diffraction gratings which are provided in pairs are employed in a double monochromator. For this reason, the single monochromator has no other function, and the double monochromator likewise, so that they are only used in their own individual applications and nothing more.

Consequently, inconvenience results when various measurements need to be made, since both the single and the double monochromators need to be prepared beforehand.

SUMMARY OF THE INVENTION

It is an object of the invention to provide a monochromator which is used by selecting a single or double monochromator according to the object to be measured.

A monochromator according to the invention is fabricated so that two spectroscopes each having one or more dispersion elements are disposed in series with each other in an optical path, and that a mirror is positioned in one or both of the spectroscopes and may be positioned equivalently to where the dispersion element(s) are located so that it may be switched over from the dispersion element(s).

Concave diffraction gratings such as spherical, ellipsoidl or toroidal concave diffraction gratings, or plane diffraction gratings such as ethelette, echelle or laminar diffraction gratings have been proposed as dispersion elements. On the other hand, it has been suggested that a planar or concave mirror be employed as a mirror.

BRIEF DESCRIPTION OF THE DRAWINGS

Preferred embodiments of the present invention now will be described hereunder with respect to the accompanying drawings, in which.

DETAILED DESCRIPTION OF THE PREFERRED EMBODIMENTS

Figure 1:
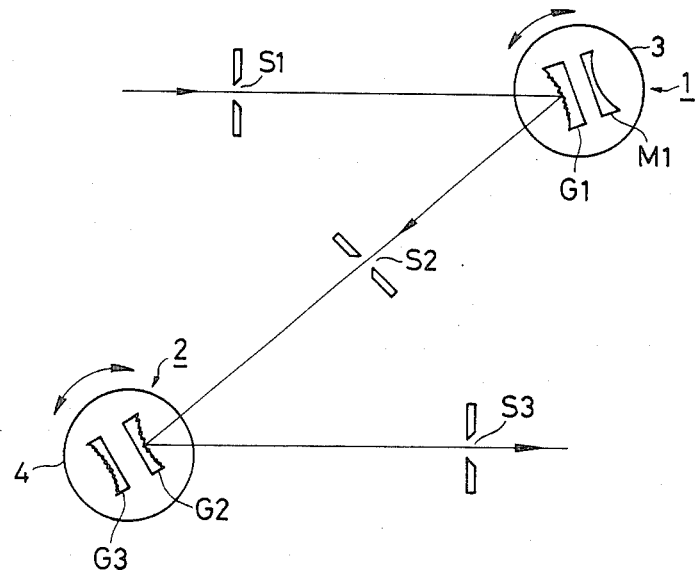
FIG. 1 is a schematic plan view showing one embodiment of the invention.

FIG. 1 shows a first embodiment of the present invention, wherein first and second spectroscopes 1, 2 are disposed in series with each other in an optical path. S1, S2, and S3 designate entrance, intermediate, and exit slits, respectively.

The first spectroscope 1 is centered on a rotary bed 3 with a concave grating G1 and a concave mirror M1, either $G_1$ or $M_1$ being selected and oriented toward the optical path by rotation of the rotary bed 3. When the concave grating G1 is selected, the rotary bed 3 is rotated with wavelength drive. On the other hand, when the concave mirror M1 is selected, the rotary bed 3 is held fast in such a manner that the concave mirror M1 is caused to have the image of the entrance slit S1 brought to focus upon the intermediate slit S2.

The second spectroscope 2 is centered on a rotary bed 4 with concave diffraction gratings G2, G3 having different blazed wavelengths, either $G_2$ or $G_3$ being selected and oriented toward the optical path by rotation of the rotary bed 4. The rotary bed 4 is adapted for rotation with wavelength drive.

Various rotary mechanisms for the rotary bed 4 having a plurality of gratings have been well known. The invention is adapted to use any of these well known mechanisms. So far as the rotary bed 3 is concerned, a well known mechanism similar to the rotary mechanism used for the rotary bed 4 may be employed for selecting one of the concave grating G1 and the concave mirror M1. A different mechanism should be added to hold the concave mirror M1 fast in a predetermined orientation if the latter is selected.

Figure 2:
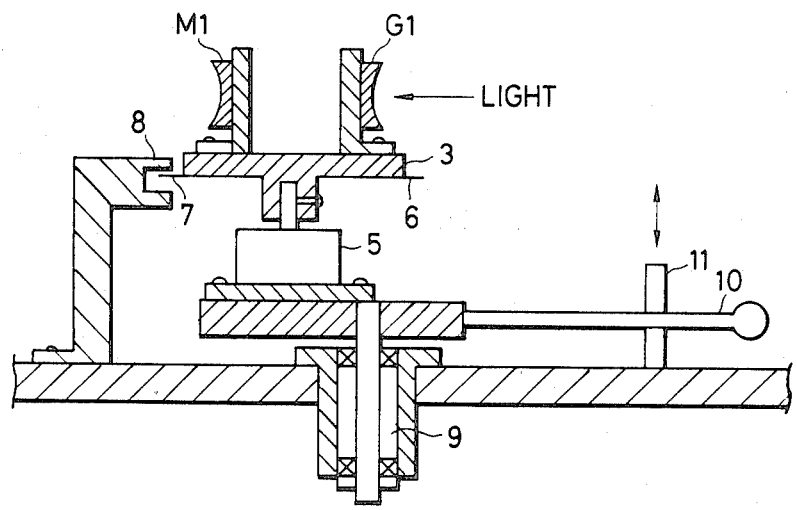
FIG. 2 is a sectional view showing a rotary mechanism used in the embodiment shown in FIG. 1.

One form of rotary mechanism which can be used for such rotary bed 3 is shown in FIG. 2.

Rigidly mounted on a rotary shaft of a pulse motor 5 is the rotary bed 3 which includes the concave grating G1 and the concave mirror M1. Flanges 6, 7 which corresponds to the concave grating G1 and the mirror M1 are mounted on the circumference of the rotary bed 3 and are detected by a sensor such as a photo-coupler 8. A detection signal from the photo-coupler 8 serves to control the drive of the pulse motor 5.

The rotary bed 3 and the pulse motor 5 are also secured to a rotary shaft 9 having a bearing means on which a sinebar means 10 is mounted. An abutment 11 is taken out only when the concave grating G1 is selected but is inserted when the mirror M1 is selected.

More specifically, the concave grating G1 is selected and directed to the optical path to provide wavelength drive for rotation of the sinebar 10, thereby rotating the concave grating G1 with the pulse motor 5. When the mirror M1 is selected and oriented to the optical path, the abutment 11 prevents the sinebar 10 from moving. As a result, concave mirror M1 is held fast in a given orientation.

Alternatively, the rotary mechanism for the rotary bed 4 on which the second spectroscope 2 is disposed may be so formed as to eliminate the abutment 11 in the rotary mechanism shown in FIG. 1.

When the invention is used as a single monochromator, the mirror M1 in the first spectroscope 1 is selected. If the invention is used as a double monochromator, the concave grating G1 in the first spectroscope 1 is selected. In either case, either the concave grating G2 or G3 is selected by the second spectroscope 2.

Figure 3:
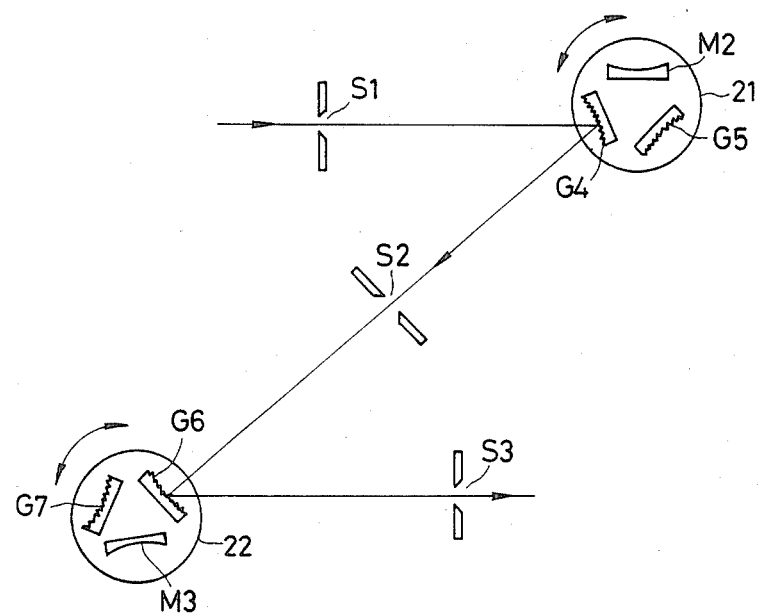
FIGS. 3 and 4 are schematic plan views showing further embodiments of the invention.

FIG. 3 shows a second embodiment of the invention, wherein first and second spectroscopes 21, 22 are arranged in series with each other in the optical path. As shown, the first spectroscope 21 includes one concave mirror M2 and two concave gratings G4, G5 having different blazed wavelengths. The second spectroscope 22 carries one concave mirror M3 and two concave diffraction gratings G6, G7 having different blazed wavelengths.

When this embodiment of the invention is used as a single monochromator, the first and second spectroscopes 21 and 22 select the concave mirror M2 and one of the concave gratings G6 and G7, respectively, or alternatively one of the concave gratings G4 and G5 and the mirror M3, respectively.

Further, when the invention is used as a double monochromator, the first and second spectroscopes 21 nd 22 are used to select one of the concave gratings G4 or G5 and one of the concave gratings G6 or G7, respectively.

While the aforementioned embodiments of the invention as described provide spectroscopes with concave gratings and concave mirrors, it is to be understood that a plain diffraction grating may be used in combination with a plain mirror to form Czerny-Turner or Littrow type mountings.

Figure 4:
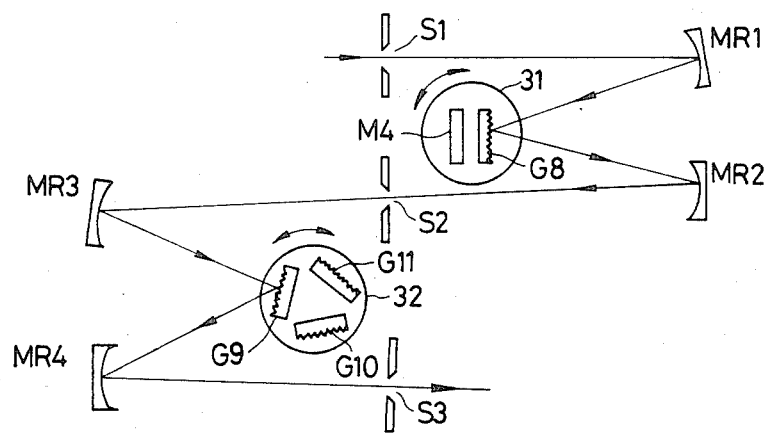

FIG. 4 illustrates a further embodiment in which the spectroscope 31 is provided with a plain diffraction grating G8 and a plain mirror M4 so that the Czerny-Turner type mounting may be applied thereto. Condensing concave mirrors MR1 and MR2 are provided on either side of the optical path from the first spectroscope 31.

A second spectroscope 32 includes three planar diffraction gratings G9–G11 having different blazed wavelengths and is formed with condensing concave mirrors MR3 and MR4 on either side of the optical path therefrom.

The monochromator according to this embodiment acts as a double monochromator when the plain grating G8 is selected by the first spectroscope 31 and also as a single monochromator when the plain mirror M4 is selected.

The embodiments shown in FIGS. 3 and 4 may use the same rotary mechanism for each of the spectroscopes, as in the embodiment of FIG. 1.

According to the invention, a single monochromator unit may be used selectively as a double or single monochromator. For example, such a unit may be used not only as a single monochromator when tightly sensitive measurements are needed, viz., when an integrating-sphere is provided and a light beam is reduced, but also as a double monochromator when a transparent specimen having high absorbance and low transmissivity is measured with close tolerance, or when monochromativity with high purity is required.

As set forth above, the monochromator according to the invention may be used conveniently and usefully according to the purpose of measurement and the object to be measured even though only one unit is provided.

I claim:

1. A monochromator defining an optical path therethrough, said monochromator comprising:
   an entrance grid, having an entrance slit and being positioned such that said entrance slit is at the beginning of said optical path;
   a first spectroscope, positioned on said optical path after said entrance grid, said first spectroscope comprising at least a first reflective element for reflecting light along said optical path and a first dispersion element for diffracting light along said optical path, said first reflective element and said first dispersion element being disposed on a first rotary bed rotatable about a first axis, one of said first reflective element and said first dispersion element being alternatively selectable by rotating said rotary bed;
   an intermediate grid, having an intermediate slit and being positioned after said first spectroscope along said optical path, said first spectroscope directing light from said entrance slit to said intermediate slit;
   a second spectroscope positioned on said optical path after said intermediate grid, said second spectroscope comprising at least a second dispersion element for diffracting light along said optical path, said second dispersion element being disposed on a second rotary bed rotatable about a second axis; and
   an exit grid, having an exit slit and being positioned on said optical path after said second spectroscope, said second spectroscope directing light from said intermediate slit to said exit slit.

2. A monochromator as claimed in claim 1, further comprising a plurality of pairs of condensing concave mirrors, one of each of said pairs of condensing concave mirrors being positioned in said optical path before and after each of said spectroscopes.

3. A monochromator as claimed in claim 1, wherein said first reflective element is selected from a group consisting of plain mirrors and concave mirrors.

4. A monochromator as claimed in claim 1, wherein said first and second dispersion elements are selected from a group consisting of plain gratings and concave gratings.

5. A monochromator as claimed in claim 1, said first rotary bed further comprising a platform being rotatable about said first axis, said first reflective element and said first dispersion element being disposed thereon, and rotation means for rotating said platform about said axis so as to position said first reflective element or said first dispersion element selectively in said optical path.

6. A monochromator as claimed in claim 5, said rotation means comprising a pulse motor for rotatably driving said platform, and location means for stopping said platform in a predetermined position.

7. A monochromator as claimed in claim 6, said platform being circular in shape, said location means comprising:
   a plurality of flanges disposed on the circumference of said platform, at least one of said flanges corresponding to said first reflective element and at least one of said flanges corresponding to said first dispersion element; and
   photocoupler means for detecting the position of said flanges as said platform rotates, said photocoupler means outputting a detection signal for controlling the operation of said pulse motor.

8. A monochromator as claimed in claim 7, said positioning means further comprising sinebar means and an abutment, said abutment contacting said sinebar means and thereby preventing movement of said platform when said first reflective element is selected, said abutment being moved so as not to contact said sinebar means when said first dispersion element is selected.

* * * * *